(12) United States Patent
Mayer et al.

(10) Patent No.: US 6,971,047 B2
(45) Date of Patent: Nov. 29, 2005

(54) ERROR HANDLING OF SOFTWARE MODULES

(75) Inventors: Christian Michael Mayer, Reutlingen (DE); Oliver Rooks, Karlsruhe (DE); Andreas Schwarzhaupt, Oberrot (DE); Gernot Spiegelberg, Heimsheim (DE)

(73) Assignee: DaimlerChrysler AG, Stuttgart (DE)

( * ) Notice: Subject to any disclaimer, the term of this patent is extended or adjusted under 35 U.S.C. 154(b) by 553 days.

(21) Appl. No.: 10/231,482

(22) Filed: Aug. 30, 2002

(65) Prior Publication Data

US 2003/0060951 A1 Mar. 27, 2003

(30) Foreign Application Priority Data

Aug. 30, 2001 (DE) ................. 101 42 511

(51) Int. Cl.[7] .......................................... G06F 11/00
(52) U.S. Cl. ........................................ 714/38; 717/124
(58) Field of Search ............................. 714/38, 47, 11, 714/12, 13, 18, 16, 37, 48, 26; 717/124, 127, 717/131, 126

(56) References Cited

U.S. PATENT DOCUMENTS

| | | | | |
|---|---|---|---|---|
| 5,339,782 A | * | 8/1994 | Golzer et al. ............... | 123/399 |
| 5,671,352 A | * | 9/1997 | Subrahmaniam et al. ...... | 714/41 |
| 6,128,773 A | * | 10/2000 | Snider ........................ | 717/132 |
| 6,161,196 A | * | 12/2000 | Tsai ............................ | 714/10 |
| 6,173,229 B1 | * | 1/2001 | Fennel et al. ................ | 701/91 |
| 6,216,237 B1 | * | 4/2001 | Klemm et al. ............... | 714/38 |
| 6,247,169 B1 | * | 6/2001 | DeLong ...................... | 717/131 |
| 6,560,720 B1 | * | 5/2003 | Chirashnya et al. .......... | 714/32 |
| 2001/0020281 A1 | * | 9/2001 | Retter et al. .................. | 714/4 |

FOREIGN PATENT DOCUMENTS

| | | |
|---|---|---|
| DE | 19631309 | 2/1998 |
| EP | 0415545 | 3/1991 |
| WO | 0018613 | 4/2000 |

OTHER PUBLICATIONS

Search Report.

* cited by examiner

*Primary Examiner*—Nadeem Iqbal
(74) *Attorney, Agent, or Firm*—Crowell & Moring LLP

(57) ABSTRACT

A method and a device for handling errors of software modules for redundantly designed systems in vehicles in order to optimize error handling for redundantly designed systems in vehicles, so that errors are detected and error handling measures are introduced. In addition, error handling is configured in such a way that it can be used for a plurality of software-controlled applications that run on a control device. Furthermore, a device for performing the method uses direct and/or indirect redundant input data to determine the adjusted input data for the software modules.

10 Claims, 3 Drawing Sheets

ERROR HANDLING OF SOFTWARE MODULES

This application claims the priority of German Application No. 101 42 511.2-53, filed Aug. 30, 2001, the disclosure of which is expressly incorporated by reference herein.

BACKGROUND AND SUMMARY OF THE INVENTION

The invention relates to a method and a device for handling errors of software modules for redundantly designed systems in vehicles.

Safety-related systems in vehicles, such as "steer by wire" systems in which no permanent mechanical or hydraulic connection exists between the steering wheel and the steerable vehicle wheels, or "ESP (Electronic Stability System)" systems in which the driving behavior of the vehicle is adjusted within a driving dynamic limit, must be especially protected against failure due to errors. To increase fault tolerance, these systems are designed redundantly, so that if one control device fails, for instance, the system can switch to a redundant control device. In addition, great importance is attached to error handling in these systems. Since the goal of such safety-related systems must be to remain operable as long as possible-under certain circumstances even by means of an emergency function implemented in the system-the term quality management is also frequently used. An error then corresponds to a reduced quality, since the system can still operate, for instance, by means of the emergency function, however an error is present.

German Laid Open Application DE 196 31 309 A1 discloses a microprocessor arrangement for a vehicle control system having a plurality of redundantly designed microprocessor systems that are interconnected by bus systems. The data processing in the microprocessors serves for control systems, such as antilock and/or traction control, as well as for input signal processing. The symmetrically redundant data processing output and/or intermediate results are compared. In case of deviations, the corresponding system is turned off. In addition, data processing running in these microprocessor systems is checked, respectively, against the results of simplified data processing and for plausibility. If there are discrepancies and the data is functionally important but not "safety-critical," the control system may be temporarily maintained.

European Application EP 415 545 A2 discloses a method for error handling in data processing systems in which the software error is detected. The origin of the error is determined, and measures are taken to correct the error as a function of the origin of the error. This method does not take into consideration problems and advantages resulting from redundant systems.

International Patent WO 00/18613 discloses a method for detecting microprocessor errors in control devices of a motor vehicle in which a control device can transmit and receive data by means of a data bus. The signals output by the microprocessor of the control device are compared with predefined signal patterns. An error is detected if the signals output by the microprocessor do not match one of the predefined signal patterns. The method, however, does not provide for any additional steps for error correction.

The object of the present invention is to improve the initially described method in order to optimize error handling in redundantly designed systems in vehicles in which errors are detected and error handling measures are initiated. In addition, error handling is designed in such a way that it can be used for a plurality of software-controlled applications that run on a control device. Furthermore, a device for performing the method is provided.

This object is attained according to the invention in which direct and/or indirect redundant input data is used to determine adjusted input data for the software modules.

The software modules run on control devices and thus correspond to software-controlled applications, e.g., those used in a vehicle, for instance "steer-by-wire" or "ESP" system applications. Preferably, the software modules run in a control device. It is also feasible, however, for a software-controlled application to be distributed over a plurality of control devices.

The direct input data is identical to the input variable expected by the software module. The indirect input data is correlated with the input variable expected by the software module based on characteristics and/or tables and/or physical state equations, so that, knowing the indirect input variables makes it possible to calculate and provide an evaluation regarding the plausibility or the quality of the direct input data.

The adjusted input data is determined by means of a plausibility check, which on the one hand is based on the predefined value range of the direct input data, and on the other hand on the physical relationship between direct and indirect input data.

The state of the system is determined by assigning data quality attributes and, based thereon, software module quality attributes, which contain information about the actual quality of the data or the software modules. With the aid of this quality attribute information, quality management measures can then be initiated, such as activating emergency functions, deactivating software modules, or activating redundant software modules.

Because of the determination of the adjusted input data, the assignment of data and software module quality attributes, as well as error handling measures, are performed outside the software modules. Furthermore the corresponding data is stored in a memory means, which is accessible to the software modules involved, so that software-controlled applications or software modules can be developed independently of the error handling. This is a significant advantage, since error handling modules are generally developed for a specific software-controlled application and can be adapted only at great cost to other applications running e.g., on the same control device.

Separating error handling from the actual software-controlled applications makes it possible to achieve increased transparency in error handling. This is the case particularly if the software-controlled applications implicitly depend on one another.

Other objects, advantages and novel features of the present invention will become apparent from the following detailed description of the invention when considered in conjunction with the accompanying drawings.

One embodiment of the inventive method and a corresponding device are depicted in the drawing.

DETAILED DESCRIPTION OF THE PREFERRED EMBODIMENT

Figure 2:
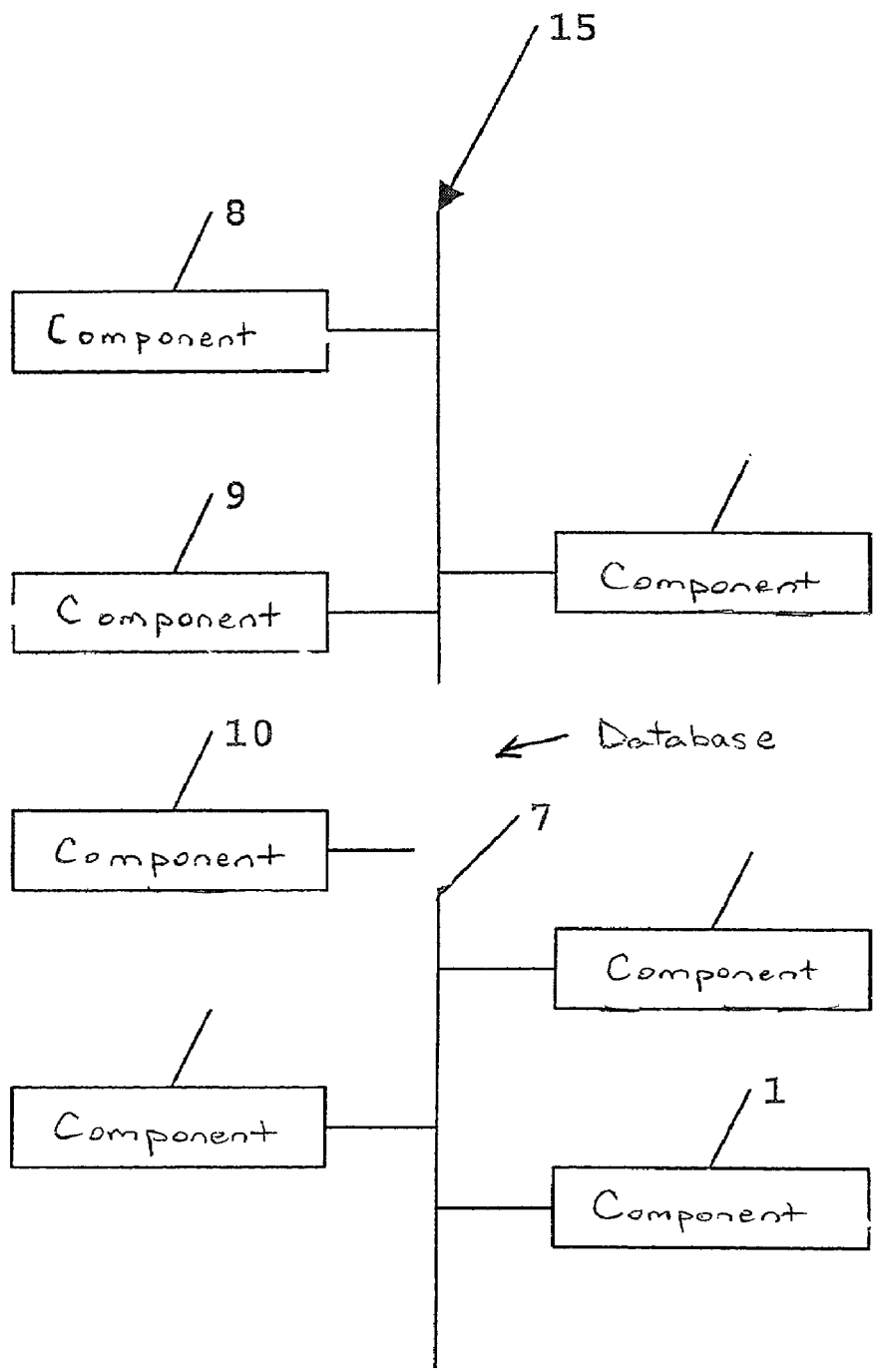
FIG. 2 is a schematic overview of a device for performing the method according to the invention.

An overview of the inventive device is depicted in FIG. 2. In the redundantly configured system, the components 1, 8–13 involved are interconnected via a data bus system 7. The components 1, 8–13 preferably comprise control devices, sensors and actuators. Components 1, 8–13 provide data to the other components 1, 8–13 and/or process data of the other components 1, 8–13. Because of the system's redundancy, components are multiply configured, e.g., the system provides not just a single sensor for measuring speed but has a plurality of speed sensors.

Data bus 7 can be configured, for instance, as a FlexRay bus, an optical MOST or D2B bus, or an electrical CAN bus in a transport means, particularly a vehicle.

Figure 1:
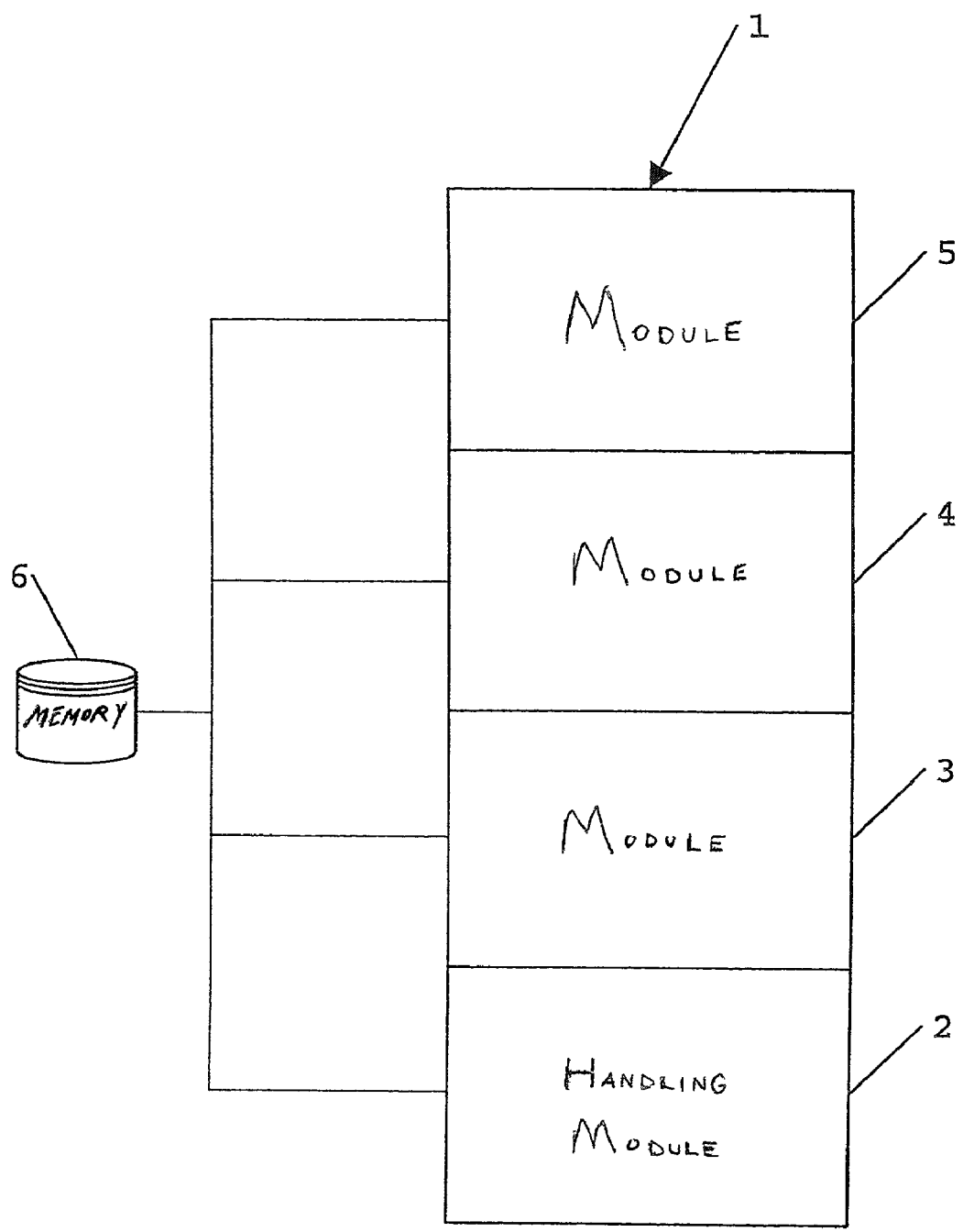
FIG. 1 schematically depicts a device for performing the method according to the invention.

FIG. 1 depicts the schematic structure of component 1, which represents a control device. Control device 1 comprises an error handling module 2 and a plurality of software modules 3–5. The error handling module 2 as well as the software modules 3–5 correspond to software-controlled applications running on the control device. These software controlled applications 2–5 exchange data with components 1, 813. Modules 2–5 are connected with memory means 6. Memory means 6 is preferably configured as a memory means of component 1.

Software module 3, by way of example, represents a software-controlled application for controlling the longitudinal dynamics of a vehicle. This closed-loop control of the longitudinal dynamics regulates the longitudinal acceleration of the vehicle. The set point of the longitudinal acceleration (aSetpoint) is defined by the gas pedal position of the driver. The software-controlled application 3 requires the actual longitudinal acceleration of the vehicle (aActual) as the input variable and determines manipulated variables for engine control and/or the braking system as the output variable.

Based on the sensors present in redundant system 15, the direct and indirect input data is made available on data bus 7. For instance, system 15, by means of components 8–13, continuously determines three speed values v1, v2, v3 and three engine speed values n1, n2, n3 and two longitudinal acceleration values a1, a2, which describe the actual state of the vehicle with respect to the closed-loop control of the longitudinal dynamics. The direct input data for software module 3 is thus a1 and a2. The indirect input data is v1, v2, v3, n1, n2, n3, since this data is correlated with the longitudinal acceleration of the vehicle via a physical state equation.

Figure 3:
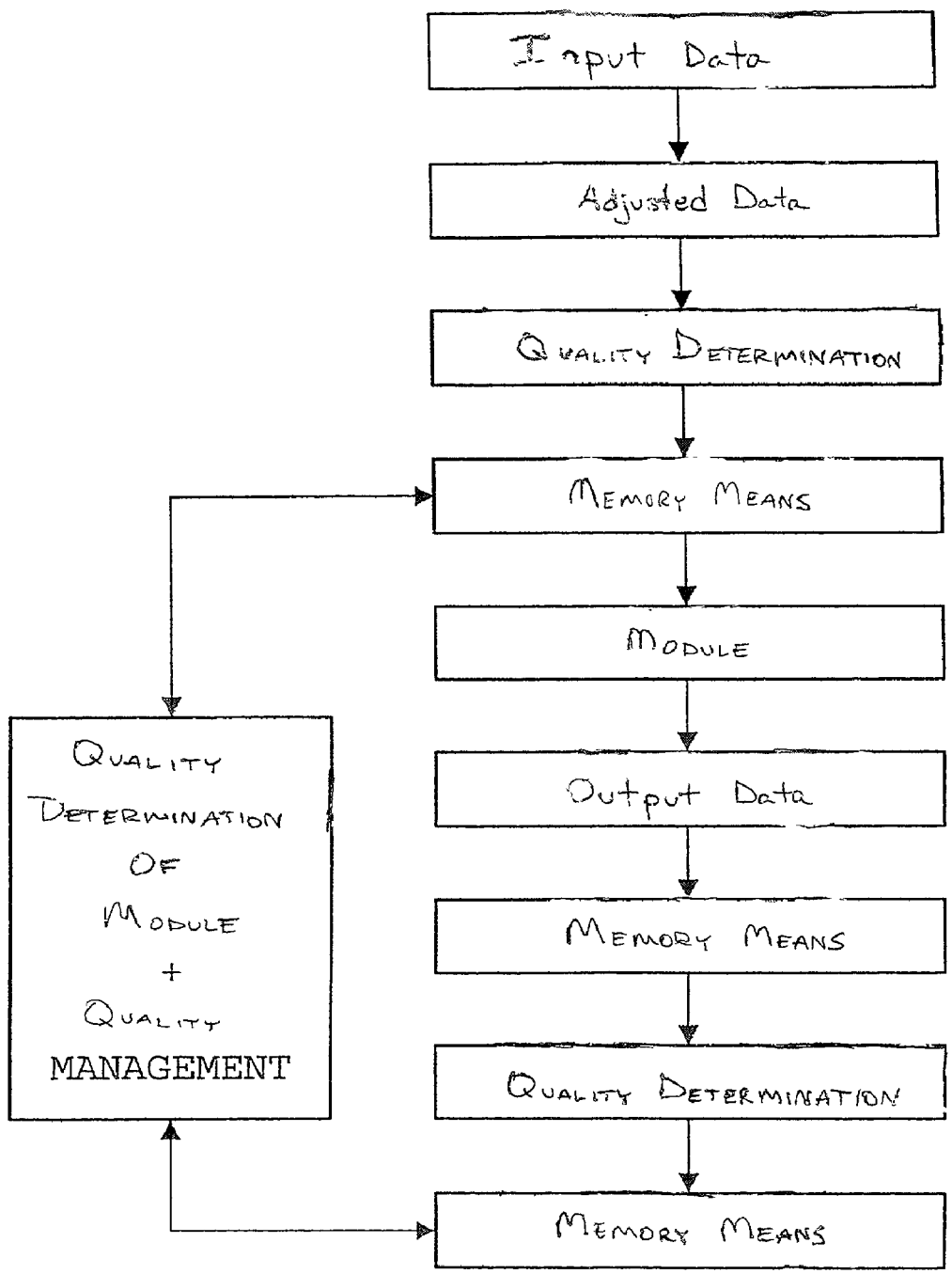
FIG. 3 is a flow diagram for performing the method according to the invention.

The invention will now be described in greater detail with reference to the flow diagram depicted in FIG. 3.

Input Data:

Control device 1 picks up direct and indirect input data (v1, v2, v3, n1, n2, n3, a1, a2) intended for software model 2 from data bus 7.

Adjusted Data:

The error handling module 2 determines the adjusted input data for software module 3. Software module 3 requires the actual longitudinal acceleration of the vehicle as input data. For this purpose, the error handling module executes a plausibility check, which is based, on the one hand, on the predefined value range of the direct input data and, on the other hand, on the physical relationship between direct and indirect input data. Error handling module 2 proceeds as follows:

If a1 and a2 are available and these values do not fall outside the predefined value range, the arithmetic mean for aActual is determined as the adjusted input data. If a1 or a2 falls outside the predefined value range or if only a1 or only a2 is available, the error handling module uses the indirect data (v1, v2, v3, n1, n2, n3) to determine the actual value aActual based on a physical state equation. If a1 and a2 fall outside the value range or if only one input datum that falls outside the value range is available and/or if no indirect data is available for a plausibility check, no adjusted input datum is determined for software module 3.

Based on the deviations from the value range or the absence of direct input data, it is possible to infer the functionality of the corresponding sensors and to take further steps.

Quality Determination:

The quality of the adjusted input data is determined as a function of the direct and/or indirect input data. The adjusted input data is assigned a data quality attribute, which reflects the quality of the input data. This quality attribute has four quality levels "4," "2," "1," and "0," the highest quality being "4" and the lowest quality "0." For instance, quality level "4" is assigned if a1 and a2 are available and fall within the predefined value range. Quality level "2" is assigned if an adjusted input datum is determined only by using indirect input data. If one or more direct input data is missing and no indirect input signals are available for a plausibility check, quality level "1" is assigned. If the error handling module cannot determine any adjusted input value, quality level "0" is assigned.

Memory Means:

The adjusted input data and the corresponding data quality attributes are stored in memory means 6.

Module:

Software module 3 reads its adjusted input datum aActual from memory means 6. The software-controlled application for the closed-loop control of longitudinal dynamics 3, after a comparison of aSetpoint and aActual, determines a torque for controlling the engine and/or a specified delay for the braking system.

Output Data:

The torque and the specified delay represent the output data for software module 3.

Memory Means:

The output data is stored in memory means 6 and is output to data bus 7.

Quality Determination:

The quality of the output data is determined via the actual incoming adjusted input data. In this case, the error handling module 2 checks whether aActual conforms to the torque that is output by the engine control and/or to the specified delay that is output to he braking system. Depending on the result, a data quality attribute is assigned to the torque output data and/or the specified delay output data. The data quality attribute for the output data is also designed for four levels. Level "4" stands for "system conforms" and level "0" for "system does not conform." Quality levels "2" and "1" are not assigned. An assignment of all four levels could, for instance, include the time span within which the system responds to the values of the manipulated variable or the output data.

Memory Means:

The data quality attributes are also stored in memory means 6.

Quality determination of the module +quality management

The error handling module 2 now uses the data quality attributes to assign a software module quality attribute to the software module 3. Based on this software module quality attribute, quality assurance measures are then taken, i.e., so-called error management or quality management is performed. Thus, the software module quality attribute represents the state of the software-controlled application. The software module quality attribute is assigned via a matrix stored in memory means 6. This matrix stores the resulting software module quality for software modules 3–5 as a function of the quality of the corresponding input and/or output data. When the matrix is established, the data quality attributes are differently weighted. According to the data quality attributes, four levels can again be assigned to the software quality attributes. The currently determined software module quality attribute is also stored in memory means 6. In addition, the matrix contains information on quality management. For each software module quality attribute, the measure for quality improvement is also stored in the matrix. For instance, in a specific software module 3–5, level "4" stands for "optimum operation," level "2" for "switch to emergency function 1," level "1" for "switch to emergency function 2," and level "0" for "automatically deactivate and activate a redundant software module." The error handling module 2 monitors the generation of corresponding actual software module quality attributes and also introduces the quality assurance measures. However, it can also be implemented in such a way that the software modules conduct a self-check by continuously verifying the quality information in the memory means and automatically introducing their own quality management measures by means of the information stored in the matrix.

The method according to the invention must be performed continuously. Only this can guarantee that the adjusted input data and the quality attributes regarding the data and the software modules reflect the actual system state. Error handling module 2 also performs the method steps, which are indicated by way of example for software module 3, for the additional software modules 4–5 in control device 1, such that error handling for software modules 3–5 is independent from the actual software-controlled applications 3–5 of the control device 1.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for error handling of software modules for redundantly designed systems in vehicles, comprising the steps of operating the software modules run in control devices;

exchanging data among the control device and software modules by a data bus;

using at least one of direct and redundant indirect input data to determine adjusted input data for the software modules by means of a plausibility check, which is based on the predefined value range for the corresponding direct input data as well as the physical relationship between direct and indirect input data;

generating, from at least one of said software modules using said adjusted input data, output data;

assigning data quality attribute to at least one of the input and/or output of a software module, based on said plausibility check;

assigning, by means of an error handling module, to the software module, a software module quality attribute; and taking quality improvement measures, by means of, the error handling module as a function of the software module quality attribute including activating an emergency function of the software module and activating a redundantly designed software module, wherein the output data as well as the adjusted input data is stored in a memory means accessible to the software module, wherein the data stored in the memory means is used to determine the quality and when the quality of the data is determined, a corresponding data quality attribute containing information on the quality of the data is assigned and stored in the memory means.

2. The method as claimed in claim 1, wherein the software module quality attribute is assigned to the software module based on the data quality attributes of the corresponding input and/or output data of the software module.

3. The method as claimed in claim 1, wherein the data quality attributes of the adjusted input data are determined depending on whether at least one of a plurality of direct input data is available, and direct and indirect input data is available, and only one direct input datum is available when the adjusted input data is determined.

4. The method as claimed in claim 1, wherein the adjusted input data is used to determine the data quality attribute of the output data.

5. The method as claimed in claim 1, wherein the software module quality attribute assigned to the corresponding software modules by means of the error handling module is stored in a memory means.

6. The method as claimed in claim 1, wherein the software module quality attribute for the software module is determined based on different weighting of the data quality attributes of the corresponding input and/or output data of the software module.

7. The method as claimed in claim 1, wherein the quality improvement measures comprise a deactivation of at least one of the control device and software module.

8. A device for error handling of software modules for redundantly designed systems in a vehicle, said device comprising:

a plurality of control devices;

a plurality of software modules;

a data bus system for connecting said plurality of control devices and said plurality of software modules;

said plurality of control devices including means for running said software modules wherein said control devices include a means for error handling which receives direct and indirect redundant input data in order to determine adjusted input data for said software modules;

memory means for storing said adjusted input data determined by said error handling means wherein said adjusted input data in said memory means is accessible to said plurality software modules, wherein said software modules generate output data as a function of said adjusted input data and wherein said output data is also stored in said memory means.

9. The device as claimed in claim 8, wherein the means for error handling are configured to use the adjusted input and output data stored in the memory means to determine the quality of the input and/or output data as well as of the software modules.

10. The device as claimed in claim 9, wherein the means for error handling include means for quality management, which is configured to provide quality improvement measures based on quality attributes stored in the memory means.

* * * * *